US010625388B2

(12) United States Patent
Liu et al.

(10) Patent No.: US 10,625,388 B2
(45) Date of Patent: Apr. 21, 2020

(54) DEVICE FOR REMOVING TOOL JOINT EDGE BURRS OF WHEEL

(71) Applicant: CITIC DICASTAL CO., LTD, Qinhuangdao, Hebei (CN)

(72) Inventors: Huiying Liu, Hebei (CN); Junmeng Li, Hebei (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 170 days.

(21) Appl. No.: 15/893,075

(22) Filed: Feb. 9, 2018

(65) Prior Publication Data
US 2019/0202019 A1 Jul. 4, 2019

(30) Foreign Application Priority Data

Dec. 29, 2017 (CN) .................. 2017 1 14766753

(51) Int. Cl.
| B24B 5/12 | (2006.01) |
| B24B 5/44 | (2006.01) |
| B24B 9/02 | (2006.01) |
| B23B 41/00 | (2006.01) |
| B23C 3/12 | (2006.01) |
| B24B 27/00 | (2006.01) |
| B24B 41/00 | (2006.01) |

(52) U.S. Cl.
CPC ............... *B24B 5/44* (2013.01); *B23B 41/00* (2013.01); *B23C 3/12* (2013.01); *B24B 5/12* (2013.01); *B24B 9/02* (2013.01); *B24B 27/0023* (2013.01); *B24B 27/0069* (2013.01); *B24B 27/0076* (2013.01); *B24B 41/005* (2013.01); *B23B 2215/08* (2013.01); *B23B 2220/08* (2013.01)

(58) Field of Classification Search
CPC .... B24B 5/12; B24B 5/35; B24B 5/44; B24B 9/02; B24B 9/04; B24B 19/00; B24B 21/02; B24B 21/12; B24B 21/16; B24B 27/0023; B24B 27/0069; B24B 27/0076; B24B 41/005; B24B 41/067; B24B 49/12; B23C 3/12; B23B 2215/08; B23B 2220/08
USPC ............................................. 451/254, 65, 69
See application file for complete search history.

(56) References Cited

U.S. PATENT DOCUMENTS

| 3,209,494 | A | * | 10/1965 | Seidel | .................. | B23B 31/36 451/24 |
| 3,258,804 | A | * | 7/1966 | Fowle | .................. | B24B 5/225 15/88 |
| 4,216,560 | A | * | 8/1980 | Schmidt | .................. | B24B 41/06 15/268 |
| 5,134,807 | A | * | 8/1992 | Keefe | .................. | B24B 7/16 451/259 |
| 5,161,281 | A | * | 11/1992 | Hanen | .................. | B08B 1/04 15/88.3 |
| 5,762,542 | A | * | 6/1998 | Sandvold | .................. | B24B 9/002 451/188 |

(Continued)

*Primary Examiner* — Eileen P Morgan
(74) *Attorney, Agent, or Firm* — Cooper Legal Group, LLC (57) ABSTRACT

A device for removing tool joint edge burrs on a cap slot edge and an outer rim of a vehicle wheel includes a vehicle wheel positioning system and a cutter system. The vehicle wheel positioning system is used to make a rotating center of a cap seam allowance superposed with that of the cutter system. The cutter system includes a pyramid cutter and four blades, the pyramid cutter is used to remove burrs on the cap slot edge of the vehicle wheel, and the four blades are used to remove burrs on the outer rim of the vehicle wheel.

1 Claim, 4 Drawing Sheets

(56) References Cited

U.S. PATENT DOCUMENTS

| | | | |
|---|---|---|---|
| 7,351,130 B1* | 4/2008 | Chang | B24B 7/06 |
| | | | 451/11 |
| 2007/0037497 A1* | 2/2007 | Tanaka | B24B 5/44 |
| | | | 451/312 |
| 2007/0042678 A1* | 2/2007 | Tanaka | B24B 5/44 |
| | | | 451/5 |
| 2013/0102233 A1* | 4/2013 | Cheon | B24B 27/033 |
| | | | 451/331 |
| 2014/0194038 A1* | 7/2014 | Lowe | B24B 9/04 |
| | | | 451/11 |

* cited by examiner

DEVICE FOR REMOVING TOOL JOINT EDGE BURRS OF WHEEL

CROSS REFERENCE TO RELATED APPLICATION

This application claims priority to Chinese Patent Application No. 201711476675.3 entitled DEVICE FOR REMOVING TOOL JOINT EDGE BURRS OF WHEEL filed Dec. 29, 2017, which is incorporated herein by reference for all purposes.

FIELD OF THE INVENTION

The present invention relates to the technology field of removing burr of a joint between a casting face and a machined face of a vehicle wheel, and specifically, to a device for removing tool joint burrs between a casting face and a machined face at an outer rim and a cap slot edge of a vehicle wheel.

BACKGROUND ART

As for a vehicle wheel having a front (i.e. a cast face) that is not machined and is directly coated, after a remaining face other than the front of the vehicle wheel is machined, both an outer rim of the vehicle wheel and a cap slot edge of the vehicle wheel have a circle of tool joint burrs in a position where the cast face and the machined face joint, and the burrs must be removed. With continuous improvement of customer's requirements for product quality, the burrs need to be removed. At present, machining of an aluminum alloy vehicle wheel is completed by adopting two lathes, i.e., first turning and second turning, and such machining process results in coaxiality deviations between an inner rim and a center hole machined in the first procedure and the outer rim and a cap seam allowance machined in the second procedure. The outer rim, the cap slot edge and the cap seam allowance are all formed by the second turning. Thus, if the burrs are desired to be removed, precision positioning should be implemented by using the cap seam allowance coaxial with the outer rim and the cap slot edge, so that the rotating center of a cutter is superposed with that of a burr part. In this way, after the burrs are removed, the outer rim and the cap slot corners are uniform, and the problems of deviation and burr residue are solved. Based on the current situation, this patent provides an automatic device for simultaneously removing tool joint edge burrs on the outer rim and the cap slot edge of the vehicle wheel.

SUMMARY OF THE INVENTION

The aim of the present invention is to provide a device for simultaneously removing tool joint edge burrs on an outer rim of a vehicle wheel and a cap slot edge of the vehicle wheel, which can be used for automatic continuous production and is novel in structure, accurate, efficient and high in automation degree.

In order to fulfill the above aim, the technical solution of the present invention is as follows:

A device for removing tool joint edge burrs of a vehicle wheel comprises a frame, a base, two first guide rails, a first movable plate, a first ball screw, a longitudinal motor, a transverse motor, two second guide rails, a second ball screw, a second movable plate, an electric cylinder, a mobile roller bed, a circle center measuring sensor, a clamping guide rail, a clamping cylinder, a first sliding plate, a second sliding plate, a gear rack, four upright posts, four clamping wheels, an inner cylinder, an inner mobile platform, an inner motor, a coupling, an inner bearing, a first shaft, a sleeve, four guide keys, a second hollow shaft, a pyramid cutter, two outer cylinders, guide posts, an outer motor, a small gear, a large gear, an outer bearing, a bearing seat, an outer movable plate, a hollow disc, a first blade, a second blade, a third blade and a fourth blade.

The base is fixed at the bottom of the frame, the two first guide rails are mounted on the base, the first movable plate is mounted on the first guide rails, the first ball screw is mounted at the bottom of the first movable plate, the longitudinal motor is fixed on the side of the frame, the output end of the longitudinal motor is connected with the first ball screw, and longitudinal movement of the first movable plate can be controlled via the longitudinal motor. The transverse motor and the two second guide rails are fixed on the first movable plate, the output end of the transverse motor is connected with the second ball screw, the second movable plate is mounted on the second guide rails, the bottom of the second movable plate is connected with the second ball screw, and transverse movement of the second movable plate can be controlled via the transverse motor. Both the mobile roller bed and the clamping guide rail are fixed on the second movable plate, the first sliding plate and the second sliding plate are symmetrically mounted on the clamping guide rail and connected with each other via the gear rack, the clamping cylinder is connected with the first sliding plate, the four upright posts are symmetrically mounted on the first sliding plate and the second sliding plate, and a clamping wheel is mounted on each upright post. The electric cylinder is mounted in the center of the second movable plate, the circle center measuring sensor is mounted at the output end of the electric cylinder, and the coordinate origin of the device is located on the center axis of the sensor in an initial state. When a vehicle wheel enters the mobile roller bed from a fixed transfer roller bed, the clamping cylinder is started to drive the four clamping wheels to preliminarily position and clamp the vehicle wheel. Next, the electric cylinder is started to drive a probe of the circle center measuring sensor to enter a cap seam allowance of the vehicle wheel, and coordinates of the circle center of the cap seam allowance are calculated via the coordinate origin of the device. Then, the transverse motor is started to drive the second movable plate to transversely compensate the coordinate difference, and the longitudinal motor is started to drive the first movable plate to longitudinally compensate the coordinate difference, so that the circle center of the cap seam allowance moves to the coordinate origin of the device, and so that the rotating center of the cutter system is coaxial with the coordinate origin. The rotating center of the cap seam allowance is superposed with that of the cutter system after compensation. Because the cap seam allowance is coaxial with the cap slot edge of the vehicle wheel and an outer rim edge of the vehicle wheel, the rotating center of the cutter is superposed with that of the burr part by movement compensation of the clamped vehicle wheel driven by the transverse motor and the longitudinal motor. This is a vehicle wheel precision positioning system.

The inner cylinder is fixed directly above the frame, the output end of the inner cylinder is connected with the inner mobile platform, the inner motor is fixed on the inner mobile platform via a mounting rack, the output end of the inner motor is connected with the first shaft, and the tail end of the first shaft is connected with a 45-degree pyramid cutter for removing burrs on the cap slot edge of the vehicle wheel.

The first shaft is matched with the inner bearing, the sleeve is mounted outside the inner bearing, four key grooves are provided in an outer wall of the sleeve, and each of the key grooves is circumferentially spaced 90 degrees from the adjacent key grooves. Four guide key slots are provided in an inner wall of the second hollow shaft, each of the guide key slots are circumferentially spaced 90 degrees from the adjacent guide key slots, one end of each of the guide keys is mounted on the sleeve, and another end of each of the guide keys is matched with a guide key slot. An outer wall of the second hollow shaft is matched with the outer bearing, the outer bearing is mounted in the bearing seat, and the bearing seat is fixed on the outer movable plate. The two outer cylinders are fixed on two sides of the upper part of the frame, and the output ends of the outer cylinders are connected with the outer movable plate. The outer motor is fixed on the outer movable plate via a support, the small gear is mounted at the output end of the motor, the small gear is matched with the large gear, and the large gear is mounted at the upper end of the second hollow shaft. The hollow disc is mounted at the lower end of the second hollow shaft, four blades, which are respectively the first blade, the second blade, the third blade and the fourth blade, are arranged on the hollow disc, each of the blades are spaced 90 degrees from the adjacent blades, the interior of the blade is a serrated step cutting edge, and the four blades have an identical rotating center and are used for removing tool joint edge burrs of the outer rim of the vehicle wheel. After the vehicle wheel is precisely positioned, the inner cylinder is started to drive the inner mobile platform to move down, and the sleeve moves down under the guidance of the guide keys, i.e., the pyramid cutter moves down to an appropriate position according to the height of a cap slot. Next, the outer cylinders are started to drive the outer movable plate to move down under the guidance of the guide posts; since the bearing seat is fixed on the outer movable plate, the second hollow shaft also moves down; and in the down process, the guide keys stop, the guide key slots slide on the guide keys, and the cutting edges of the blades contact burrs at the outer rim of the vehicle wheel. Then, the inner motor is started, the first shaft can be driven to drive the pyramid cutter to rotate, and the tool joint edge burrs on the edge of the cap slot of the vehicle wheel are removed. The outer motor is started to drive the small gear to rotate, the small gear drives the large gear to rotate, the inner wall of the second hollow shaft is connected with the sleeve via the guide keys, the sleeve is matched with the inner bearing, and the outer wall of the second hollow shaft is matched with the outer bearing. Thus, when the large gear rotates, the combination formed by the second hollow shaft and the sleeve also rotates, and does not interfere with rotation of the first shaft. The blades are driven to rotate by rotation of the second hollow shaft, and the tool joint edge burrs on the outer rim of the vehicle wheel are removed. This is a burr removing cutter system.

By adjusting the descending heights of the pyramid cutter and the blades, tool joint edge burrs of vehicle wheels having different cap slot diameters and different outer diameters can be removed, so a good universality can be achieved.

The working process of the device for removing tool joint edge burrs of the vehicle wheel is: when the vehicle wheel enters the mobile roller bed from the fixed transfer roller bed, the clamping cylinder is started to drive the four clamping wheels to preliminarily position and clamp the vehicle wheel. Next, the electric cylinder is started to drive the probe of the circle center measuring sensor to enter a cap seam allowance of the vehicle wheel, and coordinates of the circle center of the cap seam allowance are calculated via the coordinate origin of the device. Then the transverse motor is started to drive the second movable plate to transversely compensate the coordinate difference, and the longitudinal motor is started to drive the first movable plate to longitudinally compensate the coordinate difference, so that the rotating center of the cutter is superposed with that of the burr part after compensation. After the vehicle wheel is precisely positioned, the inner cylinder is started to drive the pyramid cutter to move down to an appropriate position. Next, the outer cylinders are started to drive the four blades to move down to appropriate positions. Then, the inner motor is started to drive the pyramid cutter to rotate to remove tool joint edge burrs on the cap slot edge of the vehicle wheel, and the outer motor is started to drive the four blades to rotate to remove tool joint edge burrs on the outer rim of the vehicle wheel.

The present invention can be used for simultaneously removing tool joint edge burrs on the outer rim and the cap slot edge of the vehicle wheel and used for automatic continuous production. By integrating inner and outer burr removing cutters which are respectively a cutter for removing the burrs on the cap slot edge of the vehicle wheel and cutters for removing the burrs on the outer rim of the vehicle wheel, not only the space can be saved, but also independent feeding and independent rotation of inner and outer cutters can be realized. The inner and outer cutters have higher coaxiality, and the burr removing effect is better. The device is novel in structure, accurate, efficient and high in automation degree.

In which, 1—frame, 2—base, 3—first guide rail, 4—first movable plate, 5—first ball screw, 6—longitudinal motor, 7—transverse motor, 8—second guide rail, 9—second ball screw, 10—second movable plate, 11—electric cylinder, 12—mobile roller bed, 13—circle center measuring sensor, 14—clamping guide rail, 15—clamping cylinder, 16—first sliding plate, 17—second sliding plate, 18—gear rack, 19—upright post, 20—clamping wheel, 21—inner cylinder, 22—inner mobile platform, 23—inner motor, 24—coupling, 25—inner bearing, 26—first shaft, 27—sleeve, 28—guide key, 29—second hollow shaft, 30—pyramid cutter. 31—outer cylinder, 32—guide post, 33—outer motor, 34—small gear. 35—large gear, 36—outer bearing, 37—bearing seat, 38—outer movable plate, 39—hollow disc, 40—first blade, 41—second blade, 42—third blade, 43—fourth blade. 44—vehicle wheel, 45—outer rim of the vehicle wheel, 46—cap slot edge of the vehicle wheel, 47—cap seam allowance of the vehicle wheel, 48—cap slot diameter, 49—outer diameter of the vehicle wheel.

DETAILED DESCRIPTION OF THE EMBODIMENTS

Specific details and working conditions of a device provided by the present invention will be described below in combination with the accompanying drawings.

A device for removing tool joint edge burrs of a vehicle wheel 44 comprises a frame 1, a base 2, two first guide rails 3, a first movable plate 4, a first ball screw 5, a longitudinal motor 6, a transverse motor 7, two second guide rails 8, a second ball screw 9, a second movable plate 10, an electric cylinder 11, a mobile roller bed 12, a circle center measuring sensor 13, a clamping guide rail 14, a clamping cylinder 15, a first sliding plate 16, a second sliding plate 17, a gear rack 18, four upright posts 19, four clamping wheels 20, an inner cylinder 21, an inner mobile platform 22, an inner motor 23, a coupling 24, an inner bearing 25, a first shaft 26, a sleeve 27, four guide keys 28, a second hollow shaft 29, a pyramid cutter 30, two outer cylinders 31, guide posts 32, an outer motor 33, a small gear 34, a large gear 35, an outer bearing 36, a bearing seat 37, an outer movable plate 38, a hollow disc 39, a first blade 40, a second blade 41, a third blade 42 and a fourth blade 43.

The base 2 is fixed at the bottom of the frame 1, the two first guide rails 3 are mounted on the base 2, the first movable plate 4 is mounted on the two first guide rails 3, the first ball screw 5 is mounted at the bottom of the first movable plate 4, the longitudinal motor 6 is fixed on the side of the frame 1, the output end of the longitudinal motor 6 is connected with the first ball screw 5, and longitudinal movement of the first movable plate 4 can be controlled via the longitudinal motor 6. The transverse motor 7 and the two second guide rails 8 are fixed on the first movable plate 4, the output end of the transverse motor 7 is connected with the second ball screw 9, the second movable plate 10 is mounted on the two second guide rails 8, the bottom of the second movable plate 10 is connected with the second ball screw 9, and transverse movement of the second movable plate 10 can be controlled via the transverse motor 7. Both the mobile roller bed 12 and the clamping guide rail 14 are fixed on the second movable plate 10, the first sliding plate 16 and the second sliding plate 17 are symmetrically mounted on the clamping guide rail 14 and connected with each other via the gear rack 18, the clamping cylinder 15 is connected with the first sliding plate 16, the four upright posts 19 are symmetrically mounted on the first sliding plate 16 and the second sliding plate 17, and a clamping wheel 20 is mounted on each upright post 19. The electric cylinder 11 is mounted in the center of the second movable plate 10, the circle center measuring sensor 13 is mounted at the output end of the electric cylinder 11, and the coordinate origin of the device is located on the center axis of the sensor in an initial state. When a vehicle wheel enters the mobile roller bed 12 from a fixed transfer roller bed, the clamping cylinder 15 is started to drive the four clamping wheels 20, to preliminarily position and clamp the vehicle wheel. Next, the electric cylinder 11 is started to drive a probe of the circle center measuring sensor 13 to enter a cap seam allowance 47 of the vehicle wheel 44 and coordinates of the circle center of the cap seam allowance 47 are calculated via the coordinate origin of the device. Then, the transverse motor 7 is started to drive the second movable plate 10 to transversely compensate the coordinate difference and the longitudinal motor 6 is started to drive the first movable plate 4 to longitudinally compensate the coordinate difference, so that the circle center of the cap seam allowance 47 moves to the coordinate origin of the device and the rotating center of the cutter system is coaxial with the coordinate origin. The rotating center of the cap seam allowance 47 is superposed with that of the cutter system after compensation. Because the cap seam allowance 47 is coaxial with the cap slot edge 46 of the vehicle wheel 44 and the outer rim edge 45 of the vehicle wheel, the rotating center of the cutter is superposed with that of the burr part by movement compensation of the clamped vehicle wheel driven by the transverse motor 7 and the longitudinal motor 6. This is a vehicle wheel precision positioning system.

The inner cylinder 21 is fixed directly above the frame 1, the output end of the inner cylinder 21 is connected with the inner mobile platform 22, the inner motor 23 is fixed on the inner mobile platform 22 via a mounting rack, the output end of the inner motor 23 is connected with the first shaft 26, and the tail end of the first shaft 26 is connected with the 45-degree pyramid cutter 30 for removing burrs of the cap slot edge of the vehicle wheel. The first shaft 26 is matched with the inner bearing 25, the sleeve 27 is mounted outside the inner bearing 25, four key grooves are provided in an outer wall of the sleeve 27, and each of the key grooves is circumferentially spaced 90 degrees from the adjacent key grooves. Four guide key slots are provided in an inner wall of the second hollow shaft 29, each of the guide key slots is circumferentially spaced 90 degrees from the adjacent guide key slots, one end of each of the guide keys 28 is mounted on the sleeve 27, and another end of each of the guide keys 28 is matched with a guide key slot. An outer wall of the second hollow shaft 29 is matched with the outer bearing 36, the outer bearing 36 is mounted in the bearing seat 37, and the bearing seat 37 is fixed on the outer movable plate 38. The two outer cylinders 31 are fixed on two sides of the upper part of the frame 1, and the output ends of the outer cylinders 31 are connected with the outer movable plate 38. The outer motor 33 is fixed on the outer movable plate 38 via a support, the small gear 34 is mounted at the output end of the motor, the small gear 34 is matched with the large gear 35, and the large gear 35 is mounted at the upper end of the second hollow shaft 29. The hollow disc 39 is mounted at the lower end of the second hollow shaft 29, four blades, which are respectively the first blade 40, the second blade 41, the third blade 42 and the fourth blade 43, are arranged on the hollow disc 39, each of the blades is spaced 90 degrees from the adjacent blades, the interior of each of the blades is a serrated step cutting edge, and the four blades have an identical rotating center and are used for removing tool joint edge burrs of the outer rim 45 of the vehicle wheel. After the vehicle wheel is precisely positioned, the inner cylinder 21 is started to drive the inner mobile platform 22 to move down, and the sleeve 27 moves down under the guidance of the guide keys 28, i.e., the pyramid cutter 30 moves down to an appropriate position according to the height of a cap slot. Next, the outer cylinders 31 are started to drive the outer movable plate 38 to move down under the guidance of the guide posts 32; since the bearing seat 37 is fixed on the outer movable plate 38, the second hollow shaft 29 also moves down; and in the down process, the guide keys 28 stop, the guide key slots slide on the guide keys 28, and the cutting edges of the blades contact burrs at the outer rim 45 of the vehicle wheel. Then, the inner motor 23 is started, the first shaft 26 can be driven to drive the pyramid cutter 30 to rotate, and the tool joint edge burrs on the edge of the cap slot of the vehicle wheel are removed. The outer motor 33 is started to drive the small gear 34 to rotate, the small gear 34 drives the large gear 35 to rotate. The inner wall of the second hollow shaft 29 is connected with the sleeve 27 via the guide keys 28, the sleeve 27 is matched with the inner bearing 25, and the outer wall of the second hollow shaft 29 is matched with the outer bearing 36. Thus, when the large gear 35 rotates, the combination formed by the second hollow shaft 29 and the sleeve 27 also rotates, and does not interfere with rotation of the first shaft 26. The blades are driven to rotate by rotation of the second hollow shaft 29, and the tool joint edge burrs on the outer rim 45 of the vehicle wheel are removed. This is a burr removing cutter system.

Figure 1:
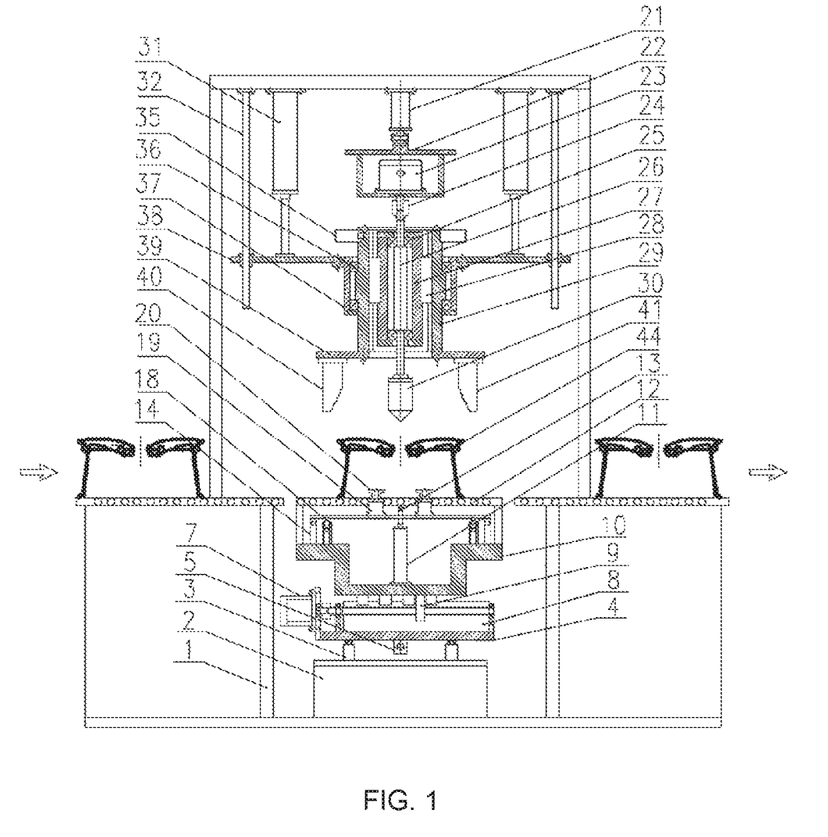
FIG. 1 is a front view of a device for removing tool joint edge burrs of a vehicle wheel in the present invention.
Figure 2:
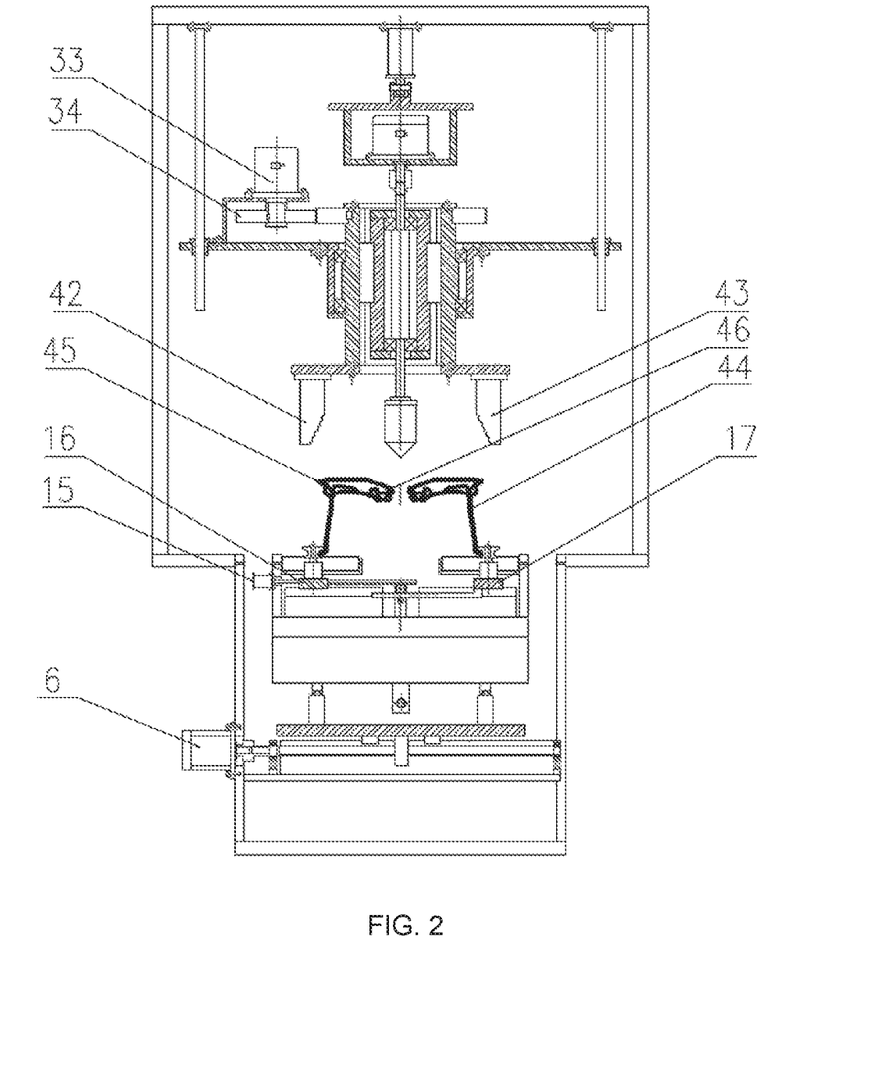
FIG. 2 is a left view of the device for removing tool joint edge burrs of the vehicle wheel in the present invention.
Figure 3:
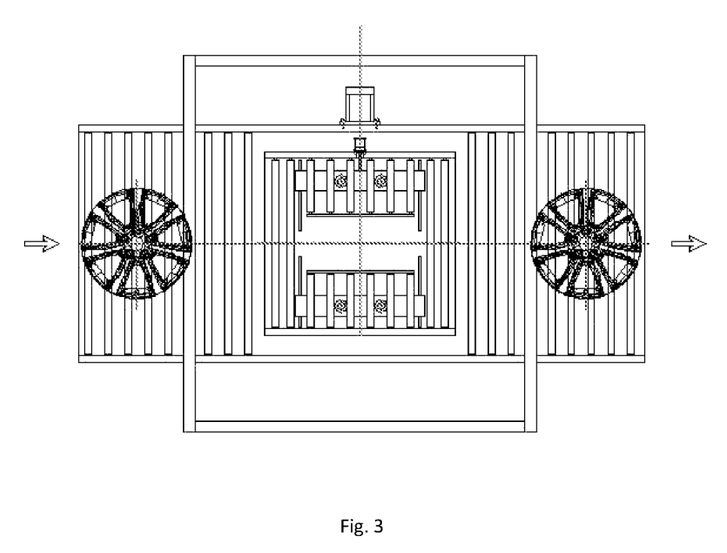
FIG. 3 is a top view of the device for removing tool joint edge burrs of the vehicle wheel in the present invention.
Figure 4:
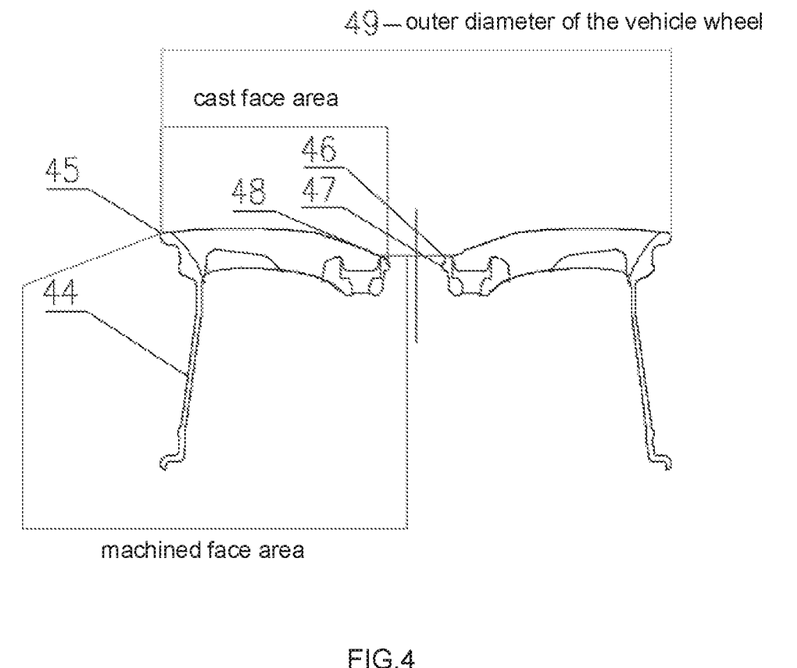
FIG. 4 is an enlarged view of the vehicle wheel of the device according to FIG. 1 in the present invention.

By adjusting the descending heights of the pyramid cutter and the blades, tool joint edge burrs of vehicle wheels 44 having different cap slot diameters 48 and different outer diameters 49 can be removed, so a good universality can be achieved.

A working process of the device for removing tool joint edge burrs of the vehicle wheel is as follows: when the vehicle wheel enters the mobile roller bed 12 from the fixed transfer roller bed, the clamping cylinder 15 is started to drive the four clamping wheels 20 to preliminarily position and clamp the vehicle wheel. Next, the electric cylinder 11 is started to drive the probe of the circle center measuring sensor 13 to enter a cap seam allowance of the vehicle wheel, and coordinates of the circle center of the cap seam allowance are calculated via the coordinate origin of the device. Then, the transverse motor 7 is started to drive the second movable plate 10 to transversely compensate the coordinate difference, and the longitudinal motor 6 is started to drive the first movable plate 4 to longitudinally compensate the coordinate difference, so that the rotating center of the cutter is superposed with that of the burr part after compensation. After the vehicle wheel is precisely positioned, the inner cylinder 21 is started to drive the pyramid cutter 30 to move down to an appropriate position. Next, the outer cylinders 31 are started to drive the four blades to move down to appropriate positions. Then, the inner motor 23 is started to drive the pyramid cutter 30 to rotate to remove tool joint edge burrs on the cap slot edge 46 of the vehicle wheel, and the outer motor 33 is started to drive the four blades to rotate to remove tool joint edge burrs on the outer rim of the vehicle wheel.

The present invention can be used for simultaneously removing tool joint edge burrs of the outer rim of the vehicle wheel and the cap slot edge 46 of the vehicle wheel and can be used for automatic continuous production; by integrating inner and outer burr removing cutters, which are respectively a cutter for removing the burrs on the cap slot edge of the vehicle wheel and cutters for removing the burrs on the outer rim of the vehicle wheel, not only the space can be saved, but also independent feeding and independent rotation of the inner and outer cutters can be realized; the inner and outer cutters have higher coaxiality, and the burr removing effect is better; and the device is novel in structure, accurate, efficient and high in automation degree.

The invention claimed is:

1. A device for simultaneously removing tool joint edge burrs on a cap slot edge and an outer rim of a vehicle wheel, comprising:

a vehicle wheel positioning system comprising a frame, a base, two first guide rails, a first movable plate, a first ball screw, a longitudinal motor, a transverse motor, two second guide rails, a second ball screw, a second movable plate, an electric cylinder, a mobile roller bed, a circle center measuring sensor, a clamping guide rail, a clamping cylinder, a first sliding plate, a second sliding plate, a gear rack, four upright posts, four clamping wheels, and a cutter system comprising an inner cylinder, an inner mobile platform, an inner motor, an inner bearing, a first shaft, a sleeve, four guide keys, a second hollow shaft, a pyramid cutter, two outer cylinders, guide posts, an outer motor, a small gear, a large gear, an outer bearing, a bearing seat, an outer movable plate, a hollow disc, a first blade, a second blade, a third blade and a fourth blade;

wherein the base is fixed at a bottom of the frame, the two first guide rails are mounted on the base, the first movable plate is mounted on the two first guide rails, the first ball screw is mounted at a bottom of the first movable plate, an output end of the longitudinal motor is connected with the first ball screw, and the longitudinal motor is used for controlling longitudinal movement of the first movable plate; the transverse motor and the two second guide rails are fixed on the first movable plate, an output end of the transverse motor is connected with the second ball screw, the second movable plate is mounted on the two second guide rails, a bottom of the second movable plate is connected with the second ball screw, and the transverse motor is used for controlling transverse movement of the second movable plate; both the mobile roller bed and the clamping guide rail are fixed on the second movable plate, the first sliding plate and the second sliding plate are symmetrically mounted on the clamping guide rail and connected with each other via the gear rack, the clamping cylinder is connected with the first sliding plate, the four upright posts are symmetrically mounted on the first sliding plate and the second sliding plate, and each of the four clamping wheels is mounted on a corresponding upright post of the four upright posts; the electric cylinder is mounted in a center of the second movable plate, and the circle center measuring sensor is mounted at an output end of the electric cylinder;

wherein the inner cylinder is fixed directly above the frame, an output end of the inner cylinder is connected with the inner mobile platform, an output end of the inner motor is connected with the first shaft, and an end of the first shaft is connected with the pyramid cutter for removing burrs on the cap slot edge of the vehicle wheel; the first shaft is matched with the inner bearing, the sleeve is mounted outside the inner bearing, four key grooves are provided in an outer wall of the sleeve, and each of the key grooves is circumferentially spaced 90 degrees from adjacent key grooves of the four key grooves; four guide key slots are provided in an inner wall of the second hollow shaft, each of the four guide key slots is circumferentially spaced 90 degrees from adjacent guide key slots of the four guide key slots, a first end of each of the four guide keys is mounted on the sleeve, and a second end of each of the four guide keys is matched with a corresponding guide key slot of the four guide key slots; an outer wall of the second hollow shaft is matched with the outer bearing, the outer bearing is mounted in the bearing seat, and the bearing seat is fixed on the outer movable plate; the guide posts and output ends of the two outer cylinders are connected with the outer movable plate; the outer motor is fixed on the outer movable plate, the small gear is mounted at an output end of the outer motor, the small gear is matched with the large gear, the large gear is mounted at an upper end of the second hollow shaft, the hollow disc is mounted at a lower end of the second hollow shaft, the first blade, and the second blade, the third blade and the fourth blade are arranged on the hollow disc to remove burrs on the outer rim of the vehicle wheel; and wherein the inner motor drives the first shaft to drive the pyramid cutter to rotate, so as to remove the tool joint edge burrs on the cap slot edge of the vehicle wheel; the outer motor drives the small gear to rotate, the small gear drives the large gear to rotate, and when the large gear rotates, the combination formed by the second hollow shaft and the sleeve also rotates, and does not interfere with rotation of the first shaft; and the first blade, the second blade, the third blade and the fourth blade are driven to rotate by rotation of the second hollow shaft, so as to remove the tool joint edge burrs on the outer rim of the vehicle wheel.

* * * * *